April 17, 1956  G. T. RONK  2,742,140
FOLDING CONVEYOR FOR ELEVATING GRADER
Filed Sept. 12, 1952  5 Sheets-Sheet 1
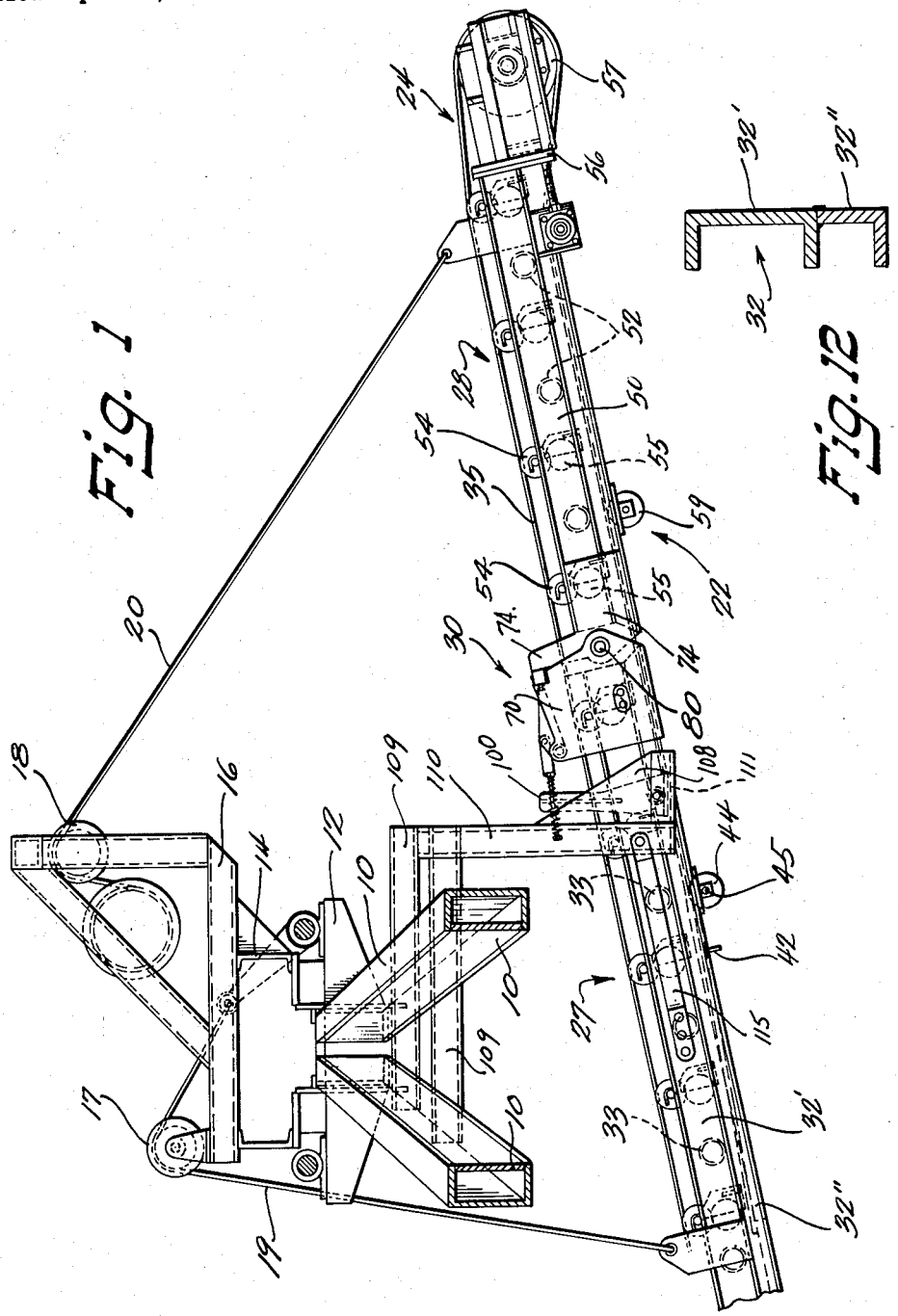
INVENTOR.
Geo. T. Ronk
BY Eugene S. Simpson
Attorney

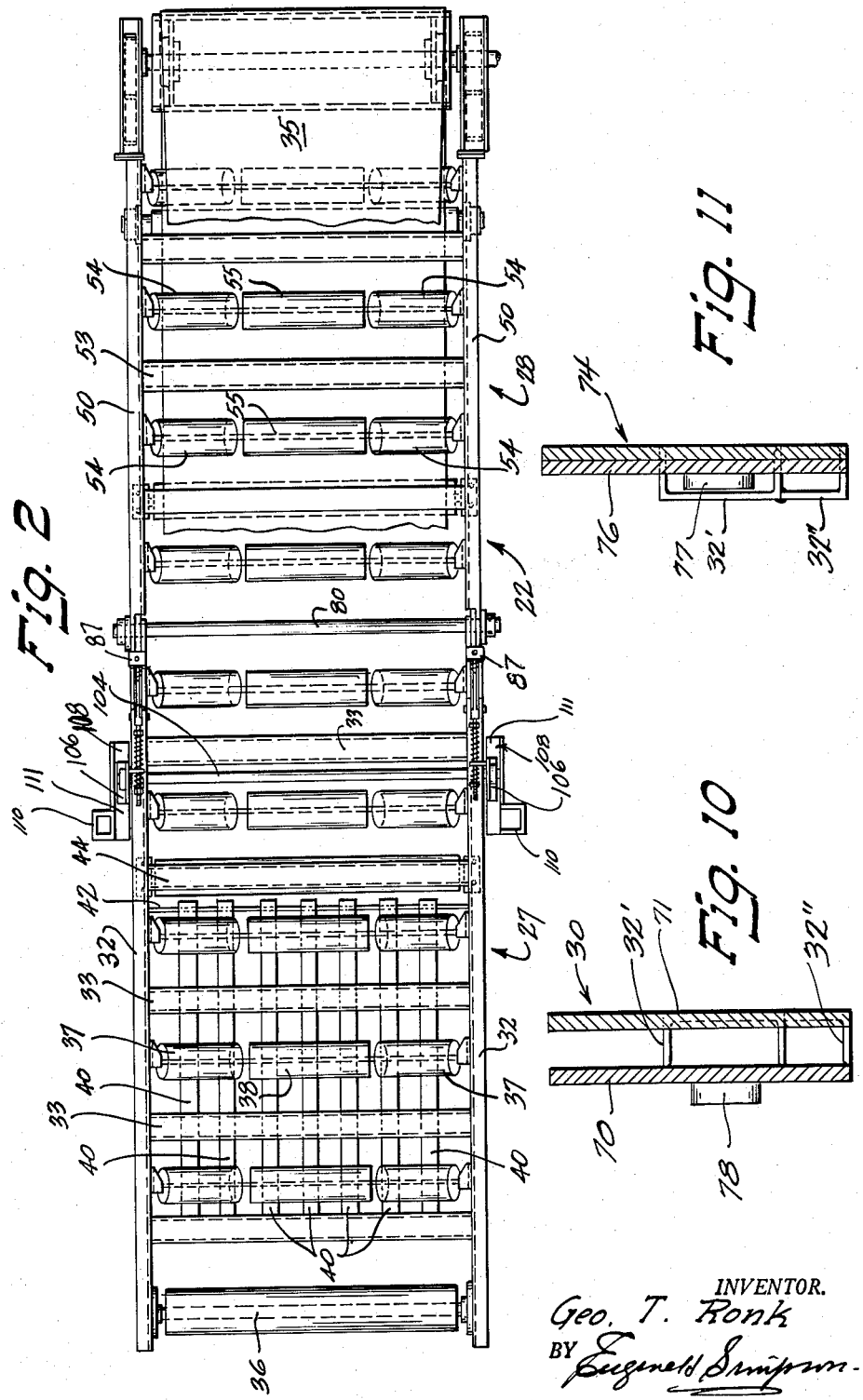

April 17, 1956 G. T. RONK 2,742,140
FOLDING CONVEYOR FOR ELEVATING GRADER
Filed Sept. 12, 1952 5 Sheets-Sheet 3
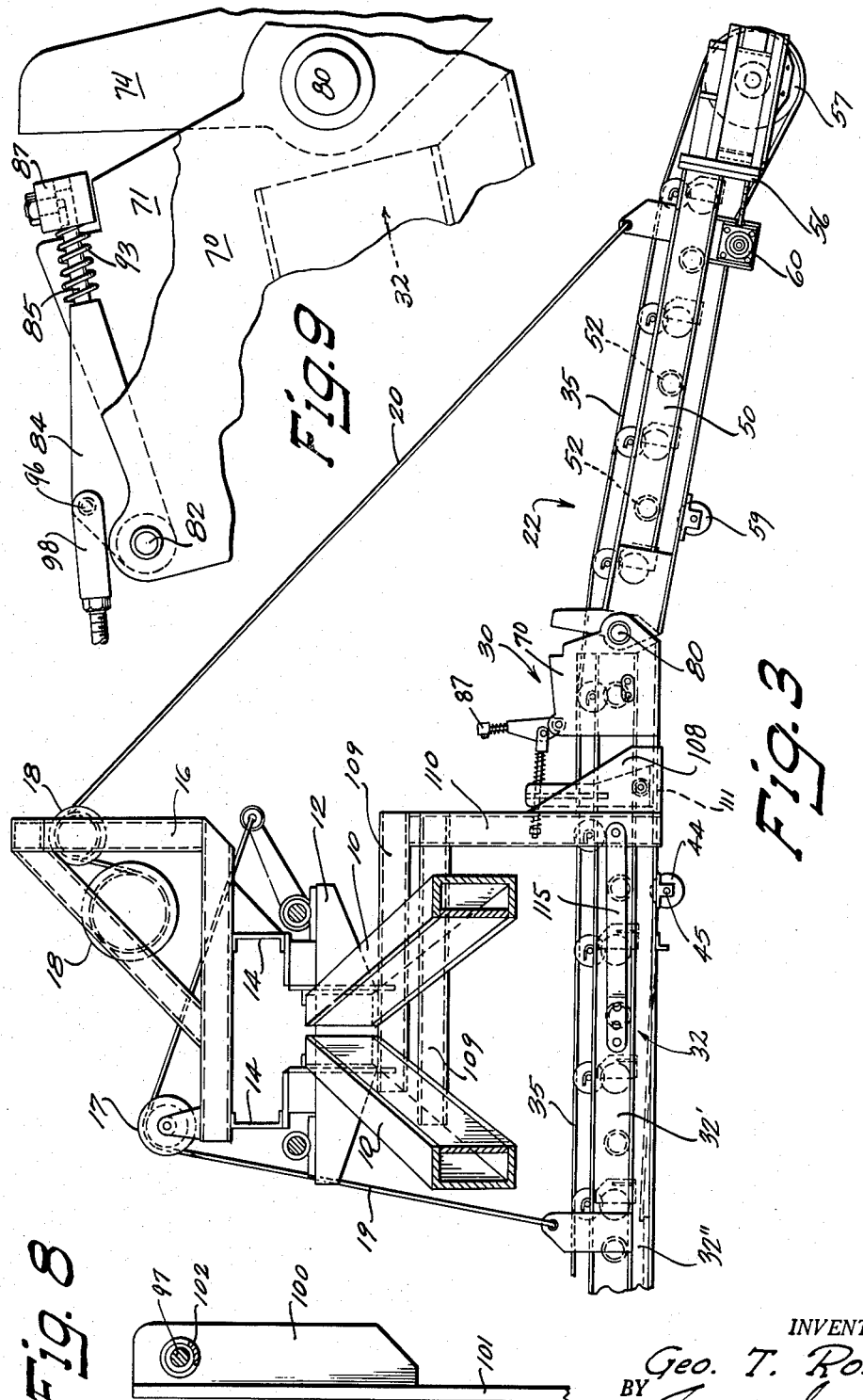
INVENTOR.
Geo. T. Ronk
BY
Attorney April 17, 1956  G. T. RONK  2,742,140
FOLDING CONVEYOR FOR ELEVATING GRADER
Filed Sept. 12, 1952  5 Sheets-Sheet 4
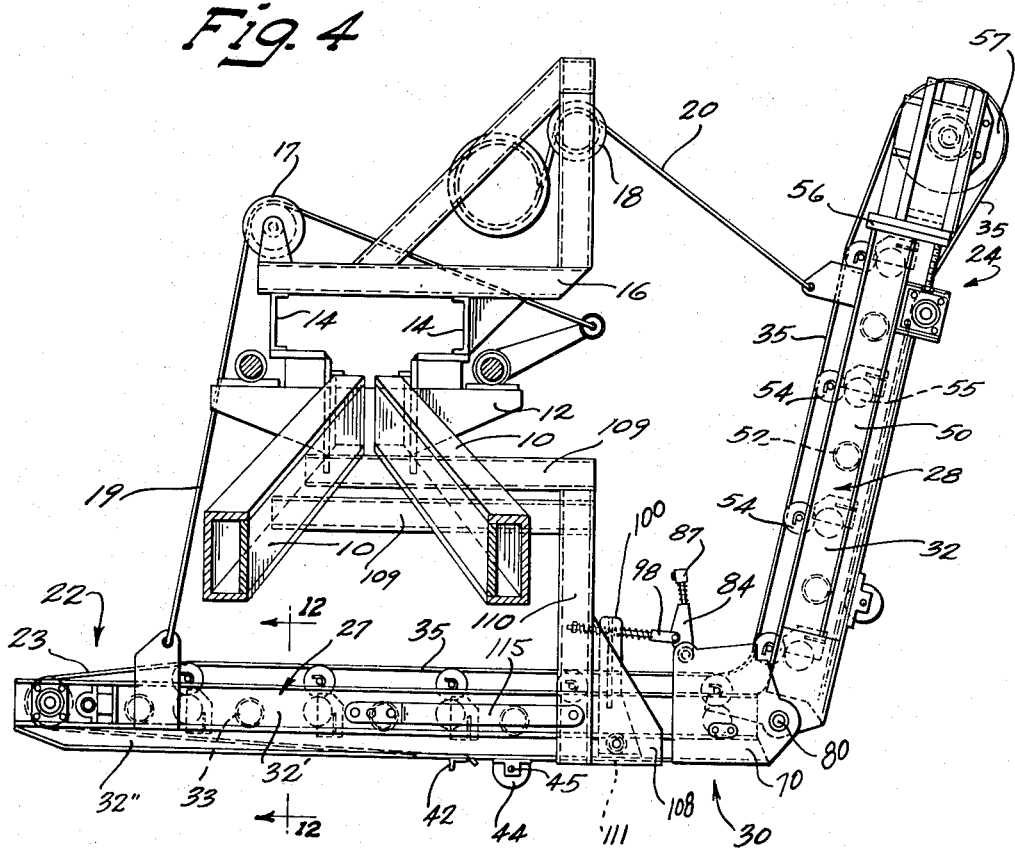
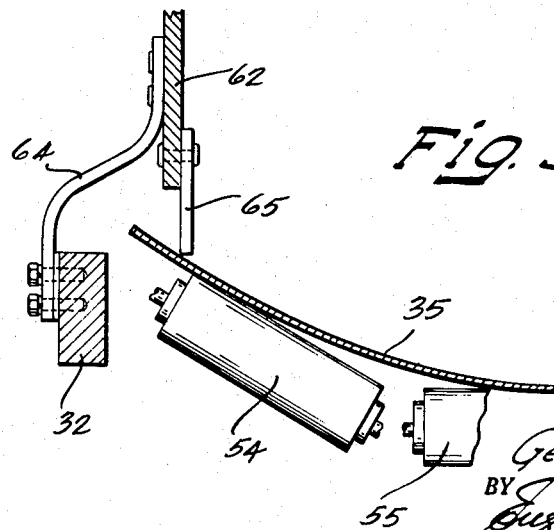
INVENTOR.
Geo. T. Ronk
BY
Eugene H. Simpson
Attorney

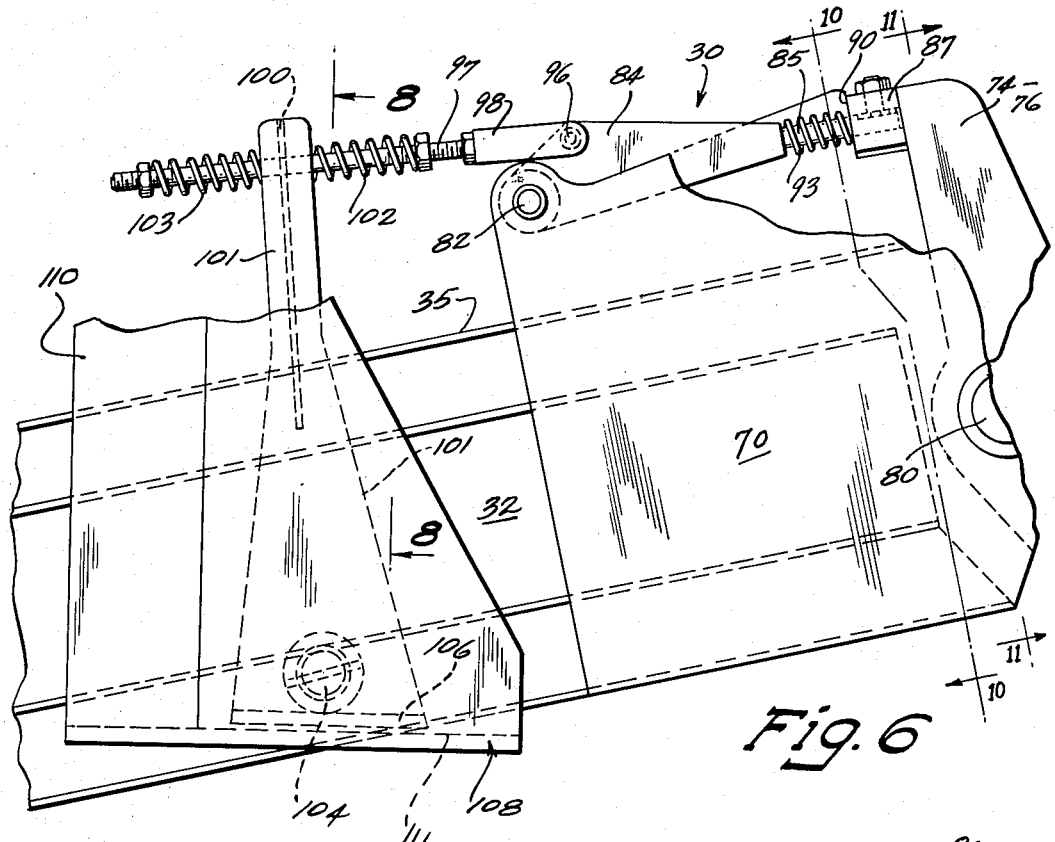
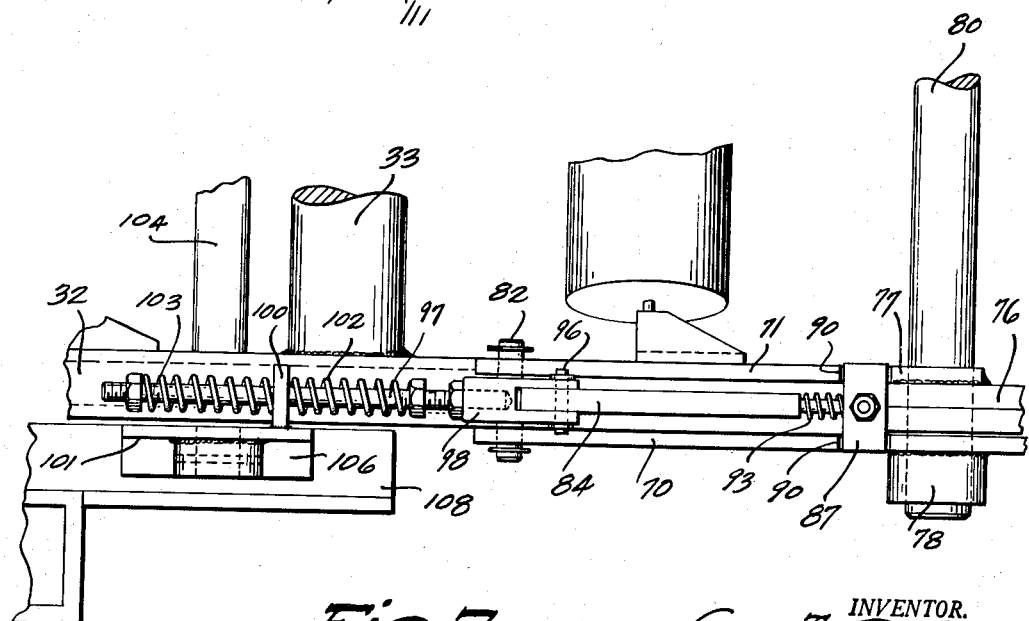

United States Patent Office 2,742,140
Patented Apr. 17, 1956

2,742,140

FOLDING CONVEYOR FOR ELEVATING GRADER

George T. Ronk, Cedar Rapids, Iowa, assignor to Barnard & Leas Mfg. Co., Inc., Cedar Rapids, Iowa Application September 12, 1952, Serial No. 309,347

11 Claims. (Cl. 198—115)

This invention relates to graders, and more particularly to a grader having a cross conveyor adapted to fold, intermediate its ends, into a carrying position.

In elevating graders, a belt conveyor is carried transversely to the direction of travel of the machine. This belt conveyor usually is loaded by a disc plow or other means at the lower or loading end of the conveyor, the earth moving upwardly on the conveyor and discharging over the top thereof. The earth so discharged may be received directly in a moving truck or discharged at the side of the cut.

Such cross conveyors average from twelve to twenty feet or more in length and since they project to the side of the machine, it is necessary to provide suitable means to remove the conveyor from the path of trees, bridges, or other obstructions.

A common means of removing the projecting portion of the conveyor from obstructions in its path of travel is to provide a joint in the center part of the conveyor, and fold the outer portion into a vertical position when traveling, or when passing trees, crossing bridges, etc.

In conveyors adapted to fold in this manner, it has heretofore been necessary to lower the conveyor to the ground and remove several bolts or other fastening means prior to lifting the conveyor to its folded position for traveling. This procedure is slow and costly, consuming the time of both men and machine.

It is an object of the present invention to provide a joint in the conveyor of an elevating grader, or the like, which will be fully automatic in operation.

Another object is to provide a folding conveyor for an elevating grader, or the like, which may be folded directly from the cab of the grader.

Another object is to provide a joint for a conveyor of an elevating grader, or the like, which will require less time and effort to operate.

A further object is to provide a lock joint for the conveyor of an elevating grader, or the like, which will be simple to operate and economical to manufacture.

A further object of the invention is to provide a joint for a conveyor in an elevating grader which will be strong and rugged.

A still further object of the invention is to provide a conveyor which may be supported directly on the frame of the prime mover during non-working travel.

A still further object is to provide a conveyor for an elevating grader which will have a higher efficiency than those now in use.

A still further object of the invention is to provide a conveyor for an elevating grader which may be folded, for traveling, from the cab of the grader by the operator.

Other objects will become apparent upon considering the following specification, which, when taken in conjunction with the accompanying drawings, illustrates a preferred form of the invention.

In the drawings:

Fig. 1 is a transverse cross-sectional view through the frame of an elevating power grader, showing the transverse conveyor comprising the present invention;

Fig. 2 is a top plan view of the conveyor shown in Fig. 1, parts of the conveyor belt being broken away to more clearly illustrate the conveyor construction;

Fig. 3 is a transverse cross-section similar to Fig. 1, but showing the hinge in the conveyor in unlocked position;

Fig. 4 is a transverse cross-section similar to Fig. 1, but showing the conveyor in folded position for traveling;

Fig. 5 is a detail view of the side guards for use on the transverse conveyor;

Fig. 6 is an enlarged side elevational view of the conveyor hinge, parts thereof being broken away to more clearly illustrate certain other parts;

Fig. 7 is a top plan view of the joint shown in Fig. 6;

Fig. 8 is an enlarged fragmentary view showing the side of the lock operating lever and resilient link;

Fig. 9 is a view of the conveyor hinge in an intermediate step of locking;

Fig. 10 is a cross-section taken on the line 10—10 of Fig. 6, looking in the direction of the arrows;

Fig. 11 is a cross-section taken on the line 11—11 of Fig. 6, looking in the direction of the arrows; and Fig. 12 is a transverse cross-section through the side pieces, taken on the line 12—12 of Fig. 1.

Referring to the drawings, the power unit may comprise a tractor having a motor (not shown) and tongues 10—10 leading from the tractor to a pair of lead wheels (not shown).

A power saddle 12 supports a pair of channels 14—14 which receive a frame 16 for suitably mounting sheaves 17—18. The sheaves 17—18 receive cables 19—20 which in turn support the ends of a transverse belt conveyor 22 between its lower end 23 and its upper end 24.

The conveyor 22 is constructed with a lower section 27 and an upper section 28. The sections 27 and 28 are joined together by a hinged joint, generally designated 30, to be described in detail below.

The lower section 27 of the conveyor may comprise a pair of side pieces 32 (Fig. 2) which are held in spaced parallel relationship by a plurality of transverse braces 33. The side pieces 32 may comprise channels 32' to which are welded angle irons 32" as seen in Fig. 12. The braces 33 are preferably tubular but may be made of other structural shapes, if desired.

A belt 35 is carried on a plurality of rollers 36, 37 and 38. The roller 36 is located at the loading end of the conveyor and comprises a single rotatable cylinder extending across the width of the conveyor between the two side pieces 32. The rollers 37 extend inwardly and downwardly from the side pieces 32 toward horizontal rollers 38 so that the belt assumes a trough-like shape intermediate the side pieces to assist in carrying the dirt.

The forward end of the conveyor is provided with a shoe (not shown) on the lower side of the side pieces and below the bottom of the roller 36, the shoe resting on the surface of the ground as the grader advances.

A floor, comprising a plurality of longitudinally extending bars 40, is supported between the top of the shoe and a transverse angle iron 42. A roller 44 is supported in bearings 45—45 between the lower edges of the side pieces 32 at the upper end of the floor 40 to carry the return flight of the belt.

The belt normally passes around the forward roller 36 and is carried between that roller and the roller 44. However, should the belt sag, the floor supports it above the ground and prevents both wear on the belt and drag on the conveyor.

The upper section 28 of the belt conveyor comprises side pieces 50—50, similar to the side pieces 32, the side pieces 50—50 being held in spaced parallel relationship by spacers 52, similar to the spacers 33, in the lower section 27. A plurality of rollers 54—55 similar to the rollers 37—38 are mounted between the side plates 50—50 to carry the belt 35. A rigid joint 56 provides a means which permits the insertion of increments of the conveyor to allow the conveyor to be extended to any desired length. A power driven discharge roller 57 is mounted at the upper end of the section 28. The belt 35 passes around the roller 57 and returns to the lower or loading end of the conveyor on support rollers 59—60, as well as on the roller 44 heretofore mentioned.

The earth being moved by the conveyor is prevented from falling off the sides of the conveyor by adjustable side boards 62 which are shown in some detail in Fig. 5. The side boards may comprise a wood or metal plate 62, having a plurality of arms 64 secured thereto. The arms 64 are adjustably secured to the side pieces 32—32 and 50—50 so that the plates 62 may move vertically and permit rubber aprons 65 to contact the belt 35. When the conveyor is in folded position, shown in Fig. 4, the side boards 62 confine the belt 35 and prevent the belt from becoming too slack on the conveyor. In order to avoid confusion in the drawings the side boards 62 are not shown in Figs. 1, 2, 3 and 4.

The sections 27 and 28 of the conveyor are joined together by the hinges 30—30, one of which is located at each side of the conveyor 22. Since both hinges are identical, only one will be described.

The hinge details are shown in Figs. 6 to 11, inclusive. Referring to those figures, the side pieces 32 have bearings plates 70—71 which are fixed to the side piece 32, the plate 70 being secured to the outer edges of the legs of the channel 32' and the outstanding leg of the angle 32" by welding, while the plate 71 is secured in an aperture in the base of the channel 32' and the angle 32" so as to leave sufficient space between the plates 70 and 71 to accommodate the second half of the hinge which is fixed to the upper section 28 of the conveyor. Both plates 70 and 71 extend above the tops of the side pieces 32 to allow sufficient space for the locking mechanism and to reduce leverage on the hinge.

The mating half of the hinge 30 comprises a plate 74 recessed in the side piece 50 and welded to the outstanding legs of the channel 32' and the angle 32". The plate 74 extends above the top of the side pieces 50 to a point adjacent the tops of the plates 70—71. The plate 74 has a second plate 76 welded thereto and to the cut-off ends of the side pieces 50. The plate 76 contains a bearing 77 which cooperates with a bearing 78 on the plate 70 to receive a single hinge pin 80 which extends between the hinge 30 on one side of the conveyor and a similar hinge 30 on the other side of the conveyor.

The plates 70—71 have a pivot 82 located adjacent the top thereof on the end of the plates 70—71 opposite the bearing 78. A bell crank lever 84 is mounted on the pivot 82 and extends toward the plates 74—76, the lever 84 terminating in a pin 85 which receives a locking member or block 87. The member or block 87 has limited axial movement on the pin 85 so that as the lever 84 pivots about the member or point 82, the block 87 will clear the edge of notches 90—90 in the upper edges of the plates 70—71.

To enable the block 87 to clear the notch 90, and to provide compensation for wear in the hinge, a spring 93 is mounted on the pin 85 between the lever 84 and the block 87, urging the block into its outmost position relative to the lever 84. The lock block 87 is held against the side of the notch 90 by the complementary plates 74—76 so that when the lock block 87 is in place, it prevents rotative movement of the plates 74—76 in a counterclockwise direction, as seen in Fig. 6, and maintains the conveyor in a straight line. The upstanding plates 70—71 and 74—76 constitute wings which provide sufficient leverage to cut down wear and reduce the general size and weight of the hinge. When the lock block 87 is removed by rotating the lever 84 counterclockwise, the plates 74—76 with the upper section 28 of the conveyor are free to rotate in a counterclockwise direction, as seen in Fig. 6, the plates 74—76 passing between the plates 70—71, thus permitting the upper section 28 of the conveyor to be folded into a vertical position for traveling.

An offset point 96 on the bell crank lever 84 is pivotally connected to a link 97 through a U-shaped connector 98. The link 97 passes through a plate 100 (Figs. 6, 7 and 8) in a lever 101 with springs 102—103 being interposed between the link 97 and the plate 100 to prevent breakage or damage due to improper manipulation of the control levers. The lever 101 extends downwardly to a point adjacent the under edge of the side piece 32 and is mounted on side piece 32 by means of a pivotal rod 104. The rod 104 extends between the lever 101 on one side of the machine and lever 101 on the opposite side of the machine. The lever 101 contains a horizontal foot 106 which seats on a support 108 carried from the tongue 10 of the machine.

The support 108 comprises two spaced parallel beams 109—109, which are substantially horizontal and are secured to the tongue 10 of the machine, one on either side of the conveyor 22. Each of the beams 109 has a vertical post 110 formed at the outer end of the beam, which post extends downwardly to the elevation at which it is desired to carry the conveyor 22 during traveling. The ends of the posts 110—110 have horizontal angle irons 111—111 fixed thereto at the lower ends, the angle irons 111—111 forming shelves to receive the foot 106 of the lever 101 and support the center of the conveyor during traveling between jobs.

When the foot 106 is seated on the shelf 111, the lever 101 is in a fixed vertical position so that rotation of the conveyor section 27 about the pivot 104, in raising the lower end of the section 27, causes relative rotation between the section 27 and the lever 101, causing compression of the spring 103 with a consequent tendency of the lever 84 to rotate counterclockwise about the pivot 82 and withdraw the lock block 87 from the recesses 90.

The conveyor 22 is maintained in its transverse position by a pair of links 115—115, one on each side of the conveyor 22 and pivotally connected between the posts 110 and the side pieces 32 of the conveyor. The links 115 permit the conveyor to be raised or lowered while maintaining it in transverse relationship to the direction of travel of the prime mover.

*Operation*

In operation, the machine may be started with the conveyor folded, the upper section 28 being in the position shown in Fig. 4 and the lower section 27 being raised off the ground by the cable 19 to a horizontal position and carried on the shelf 111. In this folded position the lever 84 is raised vertically and the lock block 87 is withdrawn from the notches 90. The plates 74—76 lie positioned between the plates 70—71.

When the machine arrives on the job, the operator lowers the section 28 until that section lies below the horizontal. If desired, the section 28 may be lowered until the roller 57 touches the ground. Lowering the section 28 rotates the plate 74—76 about their pivot 80 leaving an open space between the plates 74—76 and the notches 90, as seen in Fig. 3. The forward or loading end 27 of the conveyor may then be lowered to the ground.

Rotation of the lower section 27 of the conveyor about the pivot 104 causes relative movement between lever 101 and the lever 84 compressing the spring 102 and causing the lever 84 to move clockwise, as seen in Figs. 6 and 9, moving the locking member or block 87 into the notch 90.

The spring 93 pressing outwardly on the lock block 87 permits the block 87 to clear the upper corner of the notch 90. At this time, the block 87 being in locking position, the upper end of the conveyor 22 may be raised by reeling in the cable 20, rotating the upper section 28 of the conveyor about the pivot 80 until the plates 74—76 contact the lock block 87.

The pressure due to the weight of the conveyor section 28 acts through the plates 74—76 to push against the locking block 87, compressing the spring 93 and securing the block in the notch 90. The entire conveyor may be elevated further lifting the foot 106 of the lever 101 off the shelves 111—111. The conveyor then is supported at the lower end 23 on the ground and at the upper end 24 by the cable 20, there being no support at the center of the conveyor. Earth may be excavated by moving the machine forward and starting the conveyor 22. The disc plow (not shown) mounted to one side of the loading end of the conveyor moves the earth onto the belt 35 where it is transported across the machine and discharged over the top of the roller 57.

To again reach traveling position the entire conveyor is lowered until the foot 106 rests on the support 108. The upper end 28 of the conveyor is lowered further to open a substantial gap between the plates 74—76 and the block 87 to allow clearance for the block 87.

The lower end 23 of the conveyor is then lifted from the ground causing relative rotation between the lower section 27 of the conveyor and the lever 101 thus causing the lever 84 to be rotated counterclockwise and withdrawing the lock block 87 from the notch 90. That is the position of the machine as shown in Fig. 3. The upper end 24 of the conveyor may then be raised by the cable 20, operated from the cab position, to a substantially vertical position, as shown in Fig. 4, at which time the machine is again ready to travel on the highway.

It will be understood that the hereinbefore described form of the invention is to be taken merely as a preferred embodiment thereof and that various changes in size, shape and arrangement of parts may be made without departing from the spirit of the invention, or the scope of the subjoined claims.

That which is claimed as new and is desired to be secured by United States Letters Patent is:

1. In a grader, a tongue, a support carried by said tongue, a cross conveyor comprising two sections carried by said grader and mounted above said support, means to alter the elevation of the discharge end of said conveyor, means to alter the elevation of the loading end of said conveyor, a hinge connecting the two sections of said conveyor, a locking member connected with said hinge to retain the sections of the conveyor alined, and adapted upon release, to permit the conveyor to be folded to a carrying position, and means, including the means to alter the elevation of the ends of said conveyor, to release said locking member.

2. In a grader, a tongue, a support carried by said tongue, a cross conveyor carried by said grader and mounted above said support, means to alter the elevation of the discharge end of said conveyor, means to alter the elevation of the loading end of said conveyor, a hinge intermediate the ends of said conveyor, a locking member connected with said hinge to retain the conveyor in extended position, and adapted, upon release, to permit the conveyor to be folded to a carrying position, means, including the means to alter the elevation of the discharge end of said conveyor, to release said locking member, and means, including the means to vary the elevation of the loading end of the conveyor, to move the locking member into and out of locking position.

3. In a grader of the character described, a tongue, a support carried by said tongue, a cross conveyor supported from said grader and adapted in one position to rest on said support, means to vary the elevation of the discharge end of said conveyor, whereby the conveyor may be moved onto and off said support, means to vary the elevation of the loading end of said conveyor, a hinge intermediate the ends of said conveyor, a locking member for said hinge adapted, in one position, to maintain the conveyor extended, and in another position to permit the conveyor to be folded into carrying position, and a lever receivable on said support and adapted upon raising the loading end of said conveyor to urge the locking member into the second named position.

4. In a grader of the character described, a tongue, a support carried by said tongue, a cross conveyor supported from said grader and adapted in one position to rest on said support, means to vary the elevation of the discharge end of said conveyor, whereby the conveyor may be moved onto and off said support, means to vary the elevation of the loading end of said conveyor, a hinge intermediate the ends of said conveyor to permit the conveyor to be folded into a carrying position, a locking member engageable with a portion of said hinge to retain the conveyor in substantial alinement, a lever receivable on said support and adapted to rotate relative to the conveyor upon movement of the loading end of the conveyor upwardly, and resilient means connecting said lever with said locking member whereby raising the loading end of the conveyor tends to release said lock.

5. In a grader of the character described, a tongue, a conveyor support carried by said tongue, a cross conveyor carried from said tongue above said support, means to vary the elevation of the discharge end of said conveyor, means to vary the elevation of the loading end of said conveyor, a hing intermediate the ends of said conveyor to permit the conveyor to be folded, a locking block interposable between two elements of said hinge to retain the conveyor in extended position, a bell crank lever carrying said lock block and pivotally connected to one part of said conveyor, a lever pivotally connected to a part of said conveyor and receivable in a lowered position of the conveyor on said support, and resilient means connecting said last named lever with said first named lever, whereby raising the loading end of the conveyor causes relative rotation between that end of the conveyor and said last named lever, whereby said first named lever is urged into a position to release said locking block by said resilient means.

6. In a grader of the character described, a tongue, a conveyor support carried by said tongue, a cross conveyor carried from said tongue above said support, means to vary the elevation of the discharge end of said conveyor, means to vary the elevation of the loading end of said conveyor, a hinge intermediate the ends of said conveyor to permit the conveyor to be folded, a locking block interposable between two elements of said hinge to retain the conveyor in extended position, a bell crank lever carrying said lock block and pivotally connected to one part of said conveyor, a lever pivotally connected to a part of said conveyor and receivable in a lowered position of the conveyor on said support, and resilient means connecting said last named lever with the offset point on said bell crank lever, whereby raising the loading end of the conveyor causes relative rotation between that end of the conveyor and said last named lever whereby said first named lever is urged into a position to release said locking block by said resilient means.

7. A conveyor of the character described comprising and upper section, a lower section, a hinge joining said upper and lower sections to permit the conveyor to be folded for transporting, a wing on the section of the hinge attached to said lower section, a wing on the section of the hinge attached to the upper section, a locking block interposable between said wings to prevent rotation of the sections, and means operable upon movement of said sections to actuate the locking block.

8. In a grader of the character described a tongue, a cross conveyor carried from said tongue, a hinge intermediate the ends of said conveyor to permit the conveyor to be folded into a carrying position for traveling, a locking block for said hinge adapted in one position to retain the conveyor extended, a lever pivotally connected to one side of said conveyor, a second lever pivotally connected to the opposite side of said conveyor on a common pivot with said first lever, a foot on the lower end of each of said levers, means connecting said levers with said locking block whereby relative rotation between the levers and the conveyor tends to actuate the locking block, a support carried by said tongue, a shelf on the lower end of said support adapted to receive the feet of the levers and support the conveyor adjacent the hinge while traveling.

9. In a grader, a tongue, a support carried by said tongue, a cross conveyor carried by said grader and mounted above said support, means to alter at will the elevation of either end of said conveyor, a hinge intermediate the ends of the conveyor to enable the conveyor to be folded, a locking mmeber connected with said hinge to retain the conveyor in extended position, and adapted, upon release to permit the conveyor to be folded to a carrying position, means, including the means to alter the elevation of one end of said conveyor, to release said locking member, and means, including the means to vary the opposite end of the conveyor, to move the locking member into and out of locking position.

10. In a grader of the character described, a tongue, a support carried by said tongue, a cross conveyor supported from said grader and adapted in one position to rest on said support, means to vary the elevation of either end of the conveyor, whereby the conveyor may be moved onto and off said support, a hinge intermediate the ends of said conveyor on which the conveyor is adapted to fold, a locking member for said hinge adapted in one position to maintain the conveyor extended and in another position to permit the conveyor to be folded to carrying position, and a lever receivable on said support and adapted upon raising one end of said conveyor to urge the locking member into the second named position.

11. In a grader, a tongue, a support carried by said tongue, a cross conveyor carried by said grader, said cross conveyor comprising a loading section, a discharge section and a hinge member joining said sections to permit the conveyor to fold, a lever pivoted to the loading section at a point spaced from said hinge, a foot on said lever adapted to seat on said support, a locking member pivotally carried on the loading section of the grader and rotatable about the pivot from a locking position to an unlocked position, means joining the lever with a portion of the locking member and means to rotate the loading section about the lever pivot to actuate the locking member.

References Cited in the file of this patent

UNITED STATES PATENTS

| | | |
|---|---|---|
| 684,164 | Adams | Oct. 8, 1901 |
| 749,747 | Rhodes | Jan. 19, 1904 |
| 1,106,632 | De Moure | Aug. 11, 1914 |
| 1,190,564 | Lindsey | July 11, 1916 |
| 1,196,886 | Rodebaugh | Sep. 5, 1916 |
| 2,000,072 | Gedstad | May 7, 1935 |